Patented June 27, 1939

2,163,858

UNITED STATES PATENT OFFICE 2,163,858

TREATMENT OF HYDROCARBONS

Robert D. Snow, Bartlesville, Okla., assignor to Philips Petroleum Company, a corporation of Delaware No Drawing. Application December 20, 1937, Serial No. 180,912

12 Claims. (Cl. 196—13)

This invention relates to the treatment of hydrocarbon mixtures and more particularly to their treatment by selective solution in a liquid solvent.

This is a continuation-in-part of my copending application, Serial Number 708,523, filed January 26, 1934 which is now U. S. Patent 2,102,654, wherein it is disclosed that new and useful substances may be prepared by treating or reacting sulphur dioxide-olefin complexes with aqueous or alcoholic alkali or alkaline earth hydroxide solutions, ammonium hydroxide, liquid ammonia, and amines or other substituted ammonia compounds. The substances formed comprise acidic organic decomposition products and/or their salts, neutral oils or oily products and other organic decomposition products.

These neutral oils or oily products are formed when sulphur dioxide olefin complexes or resins are reacted with strong alkalis such as sodium, lithium and potassium hydroxides and the like. Solutions of substituted ammonium bases such as $(CH_3)_4NOH$ and the like may also be used. The exact nature or chemical formula of these oils is not known to me at this time. However, their method of preparation is known, as outlined in my aforementioned application Serial Number 708,523, as well as a number of their physical characteristics. For example, the oils contain carbon, hydrogen, sulphur and oxygen. As an example of the physical properties of these oils, the neutral oil produced by reacting a complex or resin of sulphur dioxide and 2-butene with caustic boils at 274–276° C., has a specific gravity of 1.113, and a molecular weight between 169 and 180. These oils may be prepared from practically any sulphur dioxide-olefin complex or resin, but they are preferably prepared in quantities from resins formed by sulphur dioxide and olefin hydrocarbons where a terminal carbon atom is not at one end of the double bond or olefin linkage. As an example, resins formed from sulfur dioxide and 2-butene, 2-pentene, 2-hexene and the like, can be reacted with an approximately 25–45 per cent aqueous solution of a strong alkali, and a neutral oil can be extracted from the reaction products. Such oil will be formed in yields up to 40 per cent or more of the original $SO_2$-olefin resin. These oils are neutral as to acid or basic reaction and for the sake of simplicity such oils will be referred to herein and in the claims appended hereto as $SO_2$-olefin-resin oils.

It is an object of this invention to separate hydrocarbons of one type or class from hydrocarbons of another type or class.

It is a further object of this invention to perform a solvent extraction process wherein hydrocarbon mixtures containing two or more types or classes of hydrocarbons are separated into at least two parts, one of which contains less of at least one type than either the original mixture or one of the other parts.

Another object of this invention is to subject a lubricating oil to treatment whereby its viscosity-temperature characteristics are improved.

Further objects and advantages will be apparent to those skilled in the art as the following discussion and disclosure proceeds.

I have found that these $SO_2$-olefin-resin oils are somewhat soluble in various hydrocarbons and types or groups of hydrocarbons, and also that various hydrocarbons and types or groups of hydrocarbons are even more soluble in these $SO_2$-olefin-resin oils. These types or groups of hydrocarbons range from saturated hydrocarbons, or paraffins, through the various hydrogen deficient hydrocarbons such as olefins and naphthenes to the most hydrogen deficient, or aromatic, hydrocarbons. I have found that in either case the degree of solubility varies considerably with the temperature, and I have further found that the degree of solubility varies widely with the type or group of hydrocarbons being considered. Although paraffin hydrocarbons are relatively insoluble in the $SO_2$-olefin-resin oil, the highly hydrogen deficient aromatic hydrocarbons are completely miscible with this material over a large temperature range, while the intermediately hydrogen deficient naphthene and olefin hydrocarbons have intermediate solubility properties. This is illustrated in Table I, in which the results obtained by intimately mixing equal volumes of hydrocarbon and $SO_2$-butene-2 resin oil and allowing the liquid phases to separate are tabulated as the volumes of the two phases in per cent of the total liquid volume.

TABLE I

| Hydrocarbon | Type or group | Resin-oil layer, percent | Hydrocarbon layer, percent | Temperature, °C. |
|---|---|---|---|---|
| Octane | Paraffin | 60 | 40 | 34 |
| Do | do | 55 | 45 | 0 |
| Diisobutylene | Olefin | 100 | | 30 |
| Do | do | 100 | | 0 |
| Do | do | 75 | 25 | −7 |
| Cyclohexane | Naphthene | 100 | | 30 |
| Do | do | 70 | 30 | 0 |
| Benzene | Aromatic | 100 | | 30 |
| Do | do | 100 | | 0 |
| Do | do | 100 | | −10 |

I have been able to use my invention relative to these SO₂-olefin-resin oils in a number of ways. It is well known that natural petroleums, and portions thereof which have been separated by distillation of one sort and another, are composed of various amounts of various types or groups of hydrocarbons. The kinds and amounts of these hydrocarbons vary considerably both with the location where the petroleum is found and with the boiling range of any particular fraction. When these petroleums, or fractions thereof are subjected either to thermal or catalytic decomposition, other groups of hydrocarbons are formed. Hydrocarbons of various groups are also present in products from coke ovens and the like.

The presence of various hydrocarbon groups in many petroleum fractions or mixtures of hydrocarbons is often undesirable, as one group or type may be less suited to perform a given function than some other group. Lubricating oils, typified by viscous petroleum fractions or residues, contain many types of hydrocarbons—paraffins, naphthenes and aromatics—and the removal of the more hydrogen deficient types by selective solvent extraction leads to improved characteristics, notably decreased sludge formation during use as an engine lubricant and also improved viscosity-temperature characteristics. As will be subsequently shown in more detail, I have been able to improve lubricating oils by such a solvent extraction using SO₂-olefin-resin oils as selective solvents.

Hydrocarbon mixtures in the motor fuel boiling range also contain various proportions of different groups of hydrocarbons. In the preparation of special fuels from such hydrocarbon mixtures, or even in the preparation of ordinary motor fuels, it is often desirable to separate or concentrate one or more of these groups of hydrocarbons. In general the more hydrogen deficient hydrocarbons have less detonating tendency than more saturated hydrocarbons, but the detonating characteristics of the members of any particular group also vary widely among themselves. By practicing my invention I am able to produce more valuable motor fuels in a number of ways. Essentially paraffinic motor fuels with undesirable detonating characteristics may be subjected to any of a number of cracking or reforming processes, whereby hydrogen-deficient hydrocarbons of more desirable characteristics in this respect are produced. My invention is then used to concentrate these reformed products, so that the unaffected hydrocarbons may be treated further. Again, with motor fuels containing originally appreciable quantities of aromatic hydrocarbons, or other non-paraffinic hydrocarbons of good antidetonating qualities, I am able to concentrate these and subject the remaining hydrocarbons to any desirable reforming treatment. On the other hand, alkylation processes produce highly branched paraffins which have excellent antidetonating characteristics without attendant tendencies to deleterious gum formation and the like. Hydrogen-deficient hydrocarbons such as olefins, concomitantly produced, may be non-destructively hydrogenated to paraffins, but in many such cases the paraffins so produced are inferior to the other paraffins originally present. In such a case a concentration of the paraffins by removal of the hydrogen-deficient hydrocarbons is the most beneficial treatment, and is easily carried out by means of this invention. In this manner a premium paraffinic motor fuel is obtained, and the less desirable hydrocarbons are readily separated and recovered in a form suitable for inclusion in ordinary fuels. Specific examples of such operations will be presented below, and other similar applications and modifications will be obvious to those skilled in the art.

This invention is also applicable to mixtures of normally gaseous hydrocarbons, especially to mixtures containing normally gaseous olefins. A part of the products of cracking and reforming operations consist of normally gaseous hydrocarbons, both olefin and paraffin. Large amounts of normally gaseous paraffin hydrocarbons are present in various places, and they may be subjected to thermal or catalytic treatment producing normally gaseous olefins. Although mixtures consisting essentially of hydrocarbons of the same number of carbon atoms per molecule, but containing both olefin and paraffin hydrocarbons, are readily formed by fractional distillation and the like, it is not such an easy matter to separate these paraffins and olefins from each other. The application of my invention solves this problem nicely, as such fractions containing normally gaseous olefins may be readily extracted using SO₂-olefin-resin oil as a selective solvent for the olefins. The olefins may then subsequently be separated in more concentrated form from the resin oil by distillation or the like.

The resin oil brought into contact as a liquid with such gaseous hydrocarbon mixtures either in the gaseous state or the liquid state dissolves the unsaturated hydrocarbons more readily than the saturated, thereby effecting a concentration of the former relative to the latter in the resin oil, from which the unsaturated rich extract may be recovered, conveniently, by distillation.

It will be seen from this discussion that my invention is applicable over a wide range. Although the discussion has been limited to various more or less well defined fractions of hydrocarbon mixtures, my invention is not to be considered to be limited thereto. Obviously, it may be applied to narrow fractions of restricted boiling range and to crude petroleum oils if other conditions warrant such treatment.

The following examples are set forth to illustrate specific applications of my invention only, and are not to be construed as limiting the same in any way, it being understood that the invention is capable of application in many ways other than these set forth below.

EXAMPLE I

A hydrocarbon lubricating oil fraction known as "240 neutral oil" and having the characteristics listed in Table II, was intimately mixed and agitated with an equal volume of an SO₂-olefin-resin oil which had been derived by treatment of an SO₂-butene-2 resin with aqueous sodium hydroxide. The mixture was homogeneous at 225° F., but separated into two distinct layers at 220° F. After thorough settling at 210° F., the resin oil was separated from the hydrocarbon layer. This layer, when freed of remaining resin oil by separation at a lower temperature and extraction with concentrated aqueous HCl, had the characteristics listed in Table II. A decided improvement in viscosity-temperature characteristics, as exemplified by the increased V. I. (viscosity index of Dean and Davis) and the decrease in the ratio of viscosity at 100° F. and at 210° F. is clearly seen.

Table II
Solvent extraction of lubricating oil

| Properties | Original 240 neutral oil | Purified undissolved hydrocarbons |
|---|---|---|
| Viscosity at 100° F. (Saybolt sec.) | 249 | 221 |
| Viscosity at 130° F | 120 | 113 |
| Viscosity at 210° F | 47 | 47 |
| V. I. | 63 | 82 |
| Viscosity at 100° F./viscosity at 210° F | 5.3 | 4.7 |

Example II

As an example of the application of my invention to the separation of hydrocarbons in the range of present day motor fuels, the following data are to be considered. An artificial blend of octane and benzene was prepared, with the composition as given in Table III. Of this blend, 40 volumes were agitated with 30 volumes of an $SO_2$-olefin-resin oil at 0° C. The portion of hydrocarbon undissolved by the resin oil had the composition given in Table III after being distilled from the traces of $SO_2$-olefin-resin oil which it contained.

The extract consisted of benzene with a relatively small amount of octane.

Table III
Preferential extraction of aromatics

| Constituent | Composition of original mixture | Composition of undissolved hydrocarbons |
|---|---|---|
| | Percent | Percent |
| Octane | 75 | 87 |
| Benzene | 25 | 13 |

Example III

As a further example of the application of my invention to the separation of hydrocarbons in the gasoline range, the following data are presented. An artificial blend of octane and diisobutylene, an octane, was prepared, the composition being as given in Table IV. Of this blend, 78 volumes were extracted with 90 volumes of an $SO_2$-olefin-resin oil.

Table IV
Preferential extraction of olefins

| Constituent | Composition of original mixture | Composition of undissolved hydrocarbons |
|---|---|---|
| | Percent | Percent |
| Octane | 51 | 71 |
| Octene | 49 | 29 |

After the undissolved hydrocarbon mixture had been purified by distillation, it had the composition as given in the table. Further extraction would leave the final undissolved hydrocarbon mixture almost completely freed of olefin, while the olefin extracted may be recovered in concentrated or practically pure form from the $SO_2$-olefin-resin oil.

Example IV

A blend of 50 per cent cyclohexane and 50 per cent octane was prepared and intimately contacted with an equal volume of an $SO_2$-olefin-resin oil at various temperatures. The relative volumes of the undissolved hydrocarbon and resin oil phases were as shown in Table V. The portion of the hydrocarbon undissolved contained a reduced concentration of cyclohexane.

Table V
Preferential extraction of naphthenes

| Temperature | Volume of undissolved hydrocarbon layer | Volume of resin oil layer |
|---|---|---|
| | Percent | Percent |
| 30° C | | 100 |
| 26° C | 29.4 | 70.6 |
| 0° C | 42.5 | 57.5 |

Example V

As an example of the application of my invention to normally gaseous hydrocarbons, a refinery butane-butene fraction maintained in the liquid state may be passed in countercurrent contact to a stream of $SO_2$-olefin-resin oil in an absorption tower, the resin oil entering at the top and the butane-butene fraction at the bottom, in conventional absorber manner. The unabsorbed hydrocarbons passing from the top of the absorber are substantially depleted in olefin content, and olefins are recovered from the resin oil passing from the absorber at the bottom. These olefins may then be subjected to polymerization or similar processes.

This process may be carried out with the hydrocarbons in either a gaseous or liquid phase. Liquid phase operation is often quite advantageous, smaller apparatus then being required. In any process in which an $SO_2$-olefin-resin oil is used as a selective solvent, the optimum conditions of temperature, pressure, relative concentrations of resin oil and material being subjected to extraction, and the number of stages of extraction will be variable and dependent to a great extent upon the composition of the material to be extracted and upon the degree of extraction desired. For any given material the optimum conditions of these variables may be easily determined by trial and experiment by one skilled in the art.

As indicated in Example I, the $SO_2$-olefin-resin oil is soluble in a concentrated aqueous solution of hydrogen chloride. I have found that the solubility of the resin oil is not confined to concentrated solutions of hydrogen chloride, but that solutions of nitric acid, sulphuric acid and the like also display this phenomenon. I have also found that solutions of $SO_2$-olefin-resin oil in concentrated aqueous hydrogen chloride are miscible at room temperature but when heated or cooled there is separation into two phases. At ordinary temperatures, $SO_2$-olefin-resin oils are also miscible to a greater or less degree in the following organic solvents:

| | |
|---|---|
| Methyl alcohol | Nitrobenzene |
| Ethyl alcohol | Ethyl acetate |
| Ether | 1-4 dioxane |
| Acetone | Nitromethane |
| Carbon tetrachloride | Isoamyl sulphone |
| Chloroform | Neat's-foot oil |
| Carbon disulphide | Castor oil |

The use of one or more of these solvents, either alone, or in combination with each other or with solvents of less solubility for hydrocarbons, such as traces of water, in extracting the $SO_2$-olefin-resin oils from hydrocarbons, will often be of advantage in a solvent extraction process. Water for example, can be incorporated in the resin oil to raise the temperature level above which complete miscibility with a hydrocarbon liquid undergoing extraction treatment occurs, and other liquids of lower miscibility with hydrocarbons than the resin oil itself may be so used.

I have also found that the $SO_2$-olefin-resin oil as initially prepared from the reaction of the $SO_2$-olefin-resin or complex with an alkali may be resolved by treatment with hydrochloric acid solutions into two components. These two components have essentially the same boiling points, but at ordinary temperatures one is liquid and the other is a crystalline solid. For instance, the oil from an $SO_2$-butene-2-resin was completely dissolved in concentrated hydrochloric acid. This was diluted with about 7 volumes of water, and a crystalline material separated, while from the remaining solution a normally liquid product was separated by extraction with ordinary ether. The boiling points were as follows:

TABLE VI

| Material | Boiling point, °C. |
|---|---|
| Original oil from $SO_2$-butene-2-resin | 274–276 |
| Crystalline portion | 267–279 |
| Oily portion | 262–274 |

Because of the similarity in many properties, I do not wish to distinguish in the solvent extraction of hydrocarbons between the neutral oil as derived from an $SO_2$-olefin-resin by treatment of the resin with alkali as described, and the neutral oil from which the crystalline material has been separated. Therefore, when I speak of $SO_2$-olefin-resin oils, it is to be understood that I may mean either of these materials. The crystalline material itself may be so used, at temperatures where the liquid state prevails and/or in the presence of other solvents such as those disclosed which depress the solidifying temperature.

I claim:

1. In a process for concentrating olefin hydrocarbons from a mixture of olefin and paraffin hydrocarbons by treatment with a selective solvent, the steps which comprise contacting said mixture with an olefin-$SO_2$-resin oil thereby concentrating said olefins in said oil, separating the resin oil from the mixture, and removing the olefin concentrate from the resin oil.

2. In the preparation of a relatively non-knocking motor fuel from an original motor fuel of relatively greater knocking tendency and containing paraffin hydrocarbons and at least one other type of hydrocarbons, the steps which comprise subjecting said original motor fuel to treatment with an $SO_2$-olefin-resin oil, and subsequently separating from said $SO_2$-olefin-resin oil a relatively non-knocking motor fuel.

3. In the treatment of a hydrocarbon lubricating oil to improve its viscosity-temperature characteristics, the steps which comprise intimately contacting said lubricating oil with an $SO_2$-olefin-resin oil, a portion of said lubricating oil being substantially insoluble in said $SO_2$-olefin-resin oil, and subsequently separating said insoluble portion as a lubricating oil.

4. In the separation of olefin hydrocarbons from a mixture containing olefin and paraffin hydrocarbons, the steps which comprise contacting said mixture with a liquid comprising an $SO_2$-olefin-resin oil at a temperature at which there is a liquid phase comprised of said $SO_2$-olefin-resin oil and olefin hydrocarbons and at least one other phase, isolating said liquid phase comprised of $SO_2$-olefin-resin oil and olefin hydrocarbons, and separating from said liquid phase a hydrocarbon mixture containing olefin hydrocarbons in greater proportion than in said mixture containing olefin and paraffin hydrocarbons.

5. In the separation of olefin hydrocarbons from a mixture containing olefin and paraffin hydrocarbons, the process which comprises contacting a mixture containing paraffin hydrocarbons and normally gaseous olefin hydrocarbons with a liquid comprising an $SO_2$-olefin-resin oil under conditions of temperature and pressure such that there is a liquid phase comprised of said $SO_2$-olefin-resin oil and normally gaseous olefin hydrocarbons and at least one other phase, isolating said liquid phase comprised of $SO_2$-olefin-resin oil and normally gaseous olefin hydrocarbons and separating therefrom a hydrocarbon mixture containing normally gaseous olefin hydrocarbons.

6. A process for improving a hydrocarbon lubricating oil which contains undesirable constituents, which comprises contacting said lubricating oil with an olefin-$SO_2$-resin oil to selectively dissolve the undesirable constituents, and separating the resin oil from the remaining lubricating oil.

7. A process for separating a concentrate of one type of hydrocarbons from a hydrocarbon mixture of different types of hydrocarbons at least one of which is more hydrogen-deficient than the others, which comprises contacting said mixture with an $SO_2$-olefin-resin oil thereby forming a concentrate of said more hydrogen-deficient hydrocarbons in solution in said $SO_2$-olefin-resin oil, separating said $SO_2$-olefin-resin oil from said mixture and separating said concentrate from said $SO_2$-olefin-resin oil.

8. In a process for concentrating hydrocarbons of one homologous series from a mixture of hydrocarbons of at least two homologous series one of which is hydrogen-deficient as compared with the other, the steps which comprise contacting said mixture with a selective solvent comprising an $SO_2$-olefin-resin oil thereby concentrating hydrocarbons of said hydrogen-deficient series in said solvent and separating said solvent from said mixture.

9. In a process of separating a mixture of different types of hydrocarbons, at least one of which is hydrogen-deficient as compared with another, into at least two fractions having different composition, the step which comprises extracting said mixture with a liquid solvent comprising an organic compound containing sulfur and oxygen, and produced by treating an $SO_2$-olefin resin with an alkaline chemical agent, whereby hydrogen-deficient hydrocarbons are extracted.

10. The process of claim 9 wherein said $SO_2$-olefin-resin was formed from $SO_2$ and a 2-olefin.

11. In the process of separating hydrogen-deficient hydrocarbons from a hydrocarbon mixture containing at least two types of hydrocarbons, one of which is more hydrogen-deficient than the other, by extraction with a selective solvent, the improvement which comprises subjecting such a hydrocarbon mixture to an extraction with an $SO_2$-olefin-resin oil under conditions to form an extract phase containing a substantial amount of the more hydrogen-deficient hydrocarbon, and at least one other phase, and separating said phases.

12. In the preparation of a motor fuel containing substantially only paraffin hydrocarbons from an original motor fuel which contains paraffin hydrocarbons and hydrogen-deficient hydrocarbons, the steps which comprise subjecting said original motor fuel to treatment with an $SO_2$-olefin-resin oil whereby hydrogen-deficient hydrocarbons are selectively dissolved, and subsequently separating undissolved hydrocarbons.

ROBERT D. SNOW.